(12) United States Patent
Binyamin

(10) Patent No.: US 9,192,868 B2
(45) Date of Patent: *Nov. 24, 2015

(54) AUDIO ANIMATION SYSTEM

(71) Applicant: E.N.T.T Ltd., Jerusalem (IL)

(72) Inventor: Moshe Binyamin, Jerusalem (IL)

(73) Assignee: E.N.T. T Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/292,944

(22) Filed: Jun. 2, 2014

(65) Prior Publication Data

US 2014/0273723 A1    Sep. 18, 2014

Related U.S. Application Data

(63) Continuation of application No. 12/642,879, filed on Dec. 21, 2009, now Pat. No. 8,753,166, which is a continuation-in-part of application No. PCT/IL2008/000707, filed on May 26, 2008.

(30) Foreign Application Priority Data

Jun. 19, 2007 (IL) .......................................... 184052

(51) Int. Cl.
| | |
|---|---|
| A63H 30/00 | (2006.01) |
| A63H 3/28 | (2006.01) |
| H04N 21/2343 | (2011.01) |
| H04N 21/41 | (2011.01) |
| H04N 21/436 | (2011.01) |
| H04N 21/4363 | (2011.01) |
| H04N 21/647 | (2011.01) |
| H04N 21/81 | (2011.01) |
| H04R 1/02 | (2006.01) |

(52) U.S. Cl.
CPC .......... *A63H 3/28* (2013.01); *H04N 21/234336* (2013.01); *H04N 21/4131* (2013.01); *H04N 21/43615* (2013.01); *H04N 21/43637* (2013.01); *H04N 21/64707* (2013.01); *H04N 21/8113* (2013.01); *A63H 2200/00* (2013.01); *H04R 1/028* (2013.01)

(58) Field of Classification Search
USPC ......................................................... 446/297
See application file for complete search history.

(56) References Cited

U.S. PATENT DOCUMENTS

| | | | | |
|---|---|---|---|---|
| 4,846,693 | A  * | 7/1989 | Baer .............................. | 434/308 |
| 5,636,994 | A  * | 6/1997 | Tong ............................. | 434/308 |
| 7,945,547 | B2 * | 5/2011 | Terashima et al. ............ | 707/705 |
| 2011/0025912 | A1* | 2/2011 | Regler .......................... | 348/460 |
| 2012/0271638 | A1* | 10/2012 | Regler .......................... | 704/272 |

* cited by examiner

*Primary Examiner* — Tramar Harper
(74) *Attorney, Agent, or Firm* — Mark M Friedman

(57) ABSTRACT

In one aspect, the present invention is directed to a system for rendering audio animation, the system comprising: two or more non-biotic figures; an audio player, having two or more audio sources correspondingly to the two or more non-biotic figures, for simultaneously playing the audio signals associated with the two or more non-biotic figures; and two or more speaker units corresponding to the two or more audio sources. The system may further comprise means for wireless transmission of the audio signal of at least one of the audio sources to a remote speaker unit thereof. The means for wireless transmission may comprise a wireless transmission unit deployed at the audio player, and a wireless receiving unit deployed at the speaker unit. The non-biotic figure may be a two-dimensional, three-dimensional figure, and so on.

21 Claims, 7 Drawing Sheets

AUDIO ANIMATION SYSTEM

PRIORITY INFORMATION

This patent application claims the benefit of and is a continuation of U.S. patent application Ser. No. 12/642,879 filed 21 Dec. 2009, having been published under publication number 2010-0099327, and which is presently pending.

FIELD OF THE INVENTION

The present invention relates to the field of animation. More particularly, the invention relates to an audio animation system.

BACKGROUND OF THE INVENTION

The term "audio-animation" refers herein to an act of creating the illusion of life to a non-biotic figure. Hence, the term "audio" is not limited to the sense of sound and includes the visual and other senses.

A talking puppet is an example of audio-animation. A talking puppet is actually a non-biotic figure adapted to play or imitate human voices. Since talking puppets are individual figures, there is no coordination between the sounds voiced by one puppet and the sounds of another puppet.

Another example of voice animation is puppet shows, very common at Disneyland and other mass entertainment centers, in which a plurality of non-biotic figures perform a show. In this case, there is coordination between the figures. A computer controls the limited movement of the puppets in coordination with a soundtrack. Since the "acting" figures and the audience are not deployed in vicinity with each other, and since the figures have a limited range of movement upon which the audience may distinguish between the talking figure and the other figures on stage, a mono sound is adequate.

It is an object of the present invention to provide a system and method for voice animation, which provides a better quality of voice animation than in the prior art.

Other objects and advantages of the invention will become apparent as the description proceeds.

SUMMARY OF THE INVENTION

The following embodiments and aspects thereof are described and illustrated in conjunction with systems, tools and methods, which are meant to be merely illustrative, not limiting in scope. In various embodiments, one or more of the above-described problems have been reduced or eliminated, while other embodiments are directed to other advantages or improvements.

In one aspect, the present invention is directed to an audio animation system, comprising:
 two or more non-biotic figures;
 an audio player, having two or more audio sources correspondingly to the two or more non-biotic figures, for simultaneously playing the audio signals associated with the two or more non-biotic figures; and
 two or more speaker units corresponding to the two or more audio sources.

Preferably, each of the speaker units is deployed closer to the non-biotic figure associated with the speaker unit than to any other of the non-biotic figures, thereby allowing to audience to associate an audio signal with the non-biotic figure thereof.

The non-biotic figure may be a two-dimensional, three-dimensional figure, and so on.

The audio player may be a computer, a DVD, an MP3 player, a cassette player, a TV set, a cellular telephone, and so forth.

The system may further comprise means for wireless transmission of the audio signal of at least one of the audio sources to a remote speaker unit thereof. The means for wireless transmission may comprise a wireless transmission unit deployed at the audio player, and a wireless receiving unit deployed at the speaker unit.

The system may further comprise interaction means with a user. Beyond well-known interaction means such as buttons, sliders, GUI, and so on, the interaction means may comprise also speech recognition means, speech-to-text converter, and so on.

Preferably, the two or more audio sources are of a stereophonic device, thereby using a well known technology available on the market.

In one embodiment of the invention, the content of the two or more audio sources is provided by a remote server over a network. The network may be a telephone network, a cable TV network, the Internet, and so forth. The system may further comprise means for selecting the content to be provided by the server, such as an SMS analyzer (a facility for analyzing the content of an SMS message and the like in order to "understand" to which content the user refers), analyzer of data sent from a Web page, and so on.

The content may be provided also by a memory card, such as SDCARD.

In another aspect, the present invention is directed to an apparatus for operating a non-biotic figure of an audio animation system, the apparatus comprising:
 a casing comprising:
  an audio inlet, to which an audio outlet of an audio player in connected;
  an RF transmitter, for transmitting the audio signal entered through the inlet;
 a circuitry installed in the non-biotic figure, the circuitry comprising:
  an RF receiver, for receiving an RF signal transmitted by the transmitter;
  an amplifier, for amplifying the signal; and
  a speaker unit, for playing the audio signal.

In one embodiment of the invention, the apparatus further comprises means for moving one or more organs of the non-biotic figures.

In another aspect of the present invention, there is presented an audio animation system, comprising a three-dimensional doll; an audio player comprising a DVD player having an associated display monitor for displaying an animated character of a DVD, the audio player having a first audio source corresponding to the doll and a second audio source corresponding to the animated character, the audio player capable of simultaneously playing the audio signals associated with the doll and of the animated character, the audio player including interaction means by means of which the doll, the animated character and a child user interact with one another; a first speaker unit capable of associating a first audio signal with the first audio source, the first speaker unit located closer to the doll than to the display monitor; and a second speaker unit capable of associating a second audio signal with the DVD player, the second speaker unit located closer to the display monitor than to the doll.

In a still further aspect of the present invention, there is a method of having animated figures interact with a child, comprising providing a doll having a receiver for receiving an audio signal, the doll having a digital processor connected to a first speaker unit for converting the audio signals into movements of portions of the doll, the receiver and speaker unit forming part of an audio player that is associated with the doll; providing a DVD player also forming part of the audio player, the DVD player including a second speaker unit and a display monitor connected to a computer, the computer connected to a web site on the World Wide Web, the web site providing content that includes animated figures; positioning the first speaker closer to the doll than to the display monitor and positioning the second speaker unit closer to the display monitor than to the doll so that a child interacting with the doll and the display monitor associate sound from the first speaker with the doll and associate sound from the second speaker with the display monitor; positioning the child so that the child can simultaneously see and hear both the doll and an animated character seen on the display monitor; and having the doll talk to the child about the animated character and having the animated character talk to the child about the doll so that the child, the doll and the animated character are interacting in a three-way conversation.

In addition to the exemplary aspects and embodiments described above, further aspects and embodiments will become apparent by reference to the figures and by study of the following detailed description.

BRIEF DESCRIPTION OF THE DRAWINGS

The objects and features of the present invention will become apparent from the following detailed description considered in conjunction with the accompanying drawings, in which:

In FIG. 6 the network is the Internet, in FIG. 7 the network is a cable TV network, and in FIG. 8 the network is a cellular network.

Figure 1:
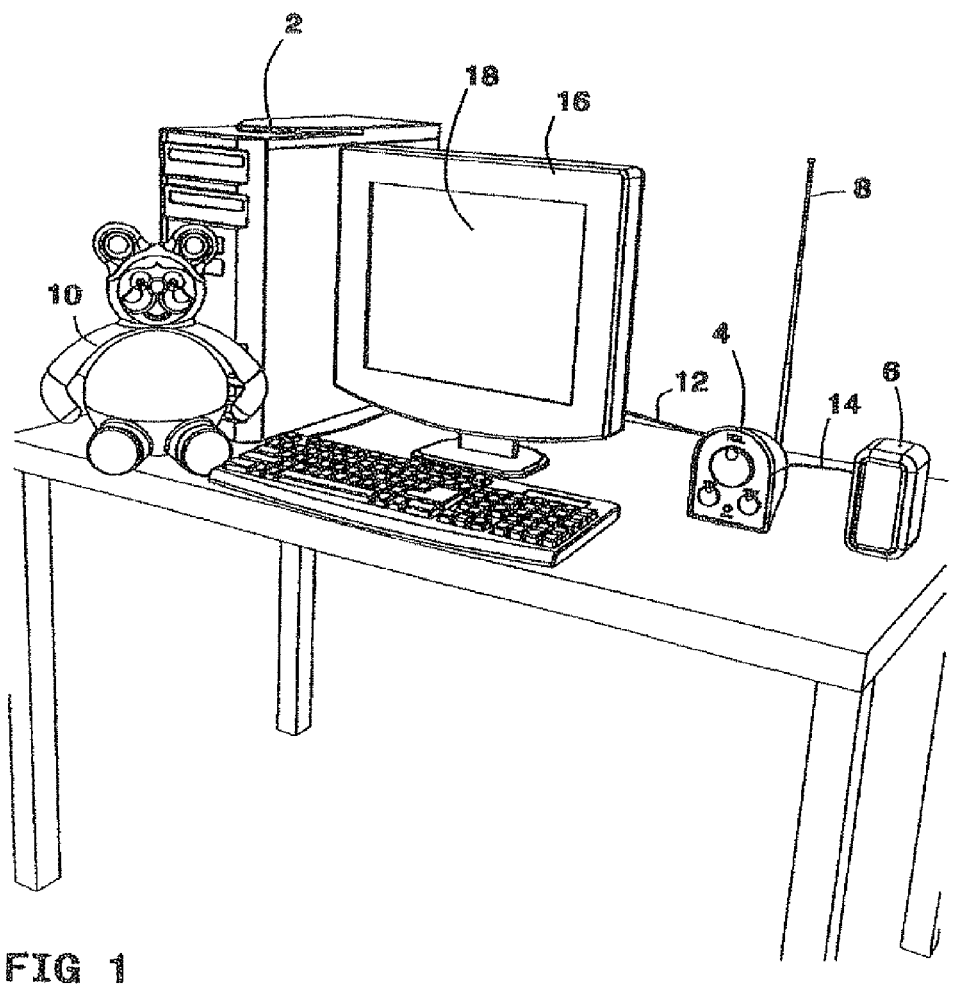
FIG. 1 pictorially illustrates an audio animation system, according to one embodiment of the invention.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein. Reference numerals may be repeated among the figures to indicate corresponding or analogous elements.

DETAILED DESCRIPTION OF PREFERRED EMBODIMENTS

In the following detailed description, numerous specific details are set forth in order to provide a thorough understanding of the disclosure. However, it will be understood by those skilled in the art that the present invention may be practiced without these specific details. In other instances, well-known methods, procedures, components and circuits have not been described in detail, so as not to obscure the present disclosure.

The term "audio player" refers herein to a system for playing audio signals.

The term "audio amplifier" refers herein to an electronic system for amplifying an audio signal.

The term "speaker unit" refers herein to a system of one or more speakers for playing an audio signal. For example, a speaker unit may comprise a bass speaker and a treble speaker.

For instance, an audio system may comprise an audio player such as a CD player, cassette player and so forth; an audio amplifier; and a plurality of speaker units.

The terms "audio source" and "audio channel" as used herein are equivalent.

According to embodiments of the present invention, an audio animation system comprises:

An audio player capable of playing simultaneously audio signals of two or more audio sources.

Two or more audio amplifiers corresponding to the audio sources, for amplifying the audio signals of the two or more audio sources.

Two or more speaker units, corresponding to the audio sources, each of the speaker units being deployed in the vicinity of a figure associated with the audio signal from the speaker. A figure may be three-dimensional such as a puppet, two-dimensional such as a computer displaying a figure, and so forth.

The transmitted signal from the audio player and a speaker unit thereof may be through wired transmission, as well as through wireless transmission such as radio and infrared signals.

FIG. 1 pictorially illustrates an audio animation system, according to one embodiment of the invention. The illustration demonstrates the system from a user's point of view.

Figure 2:
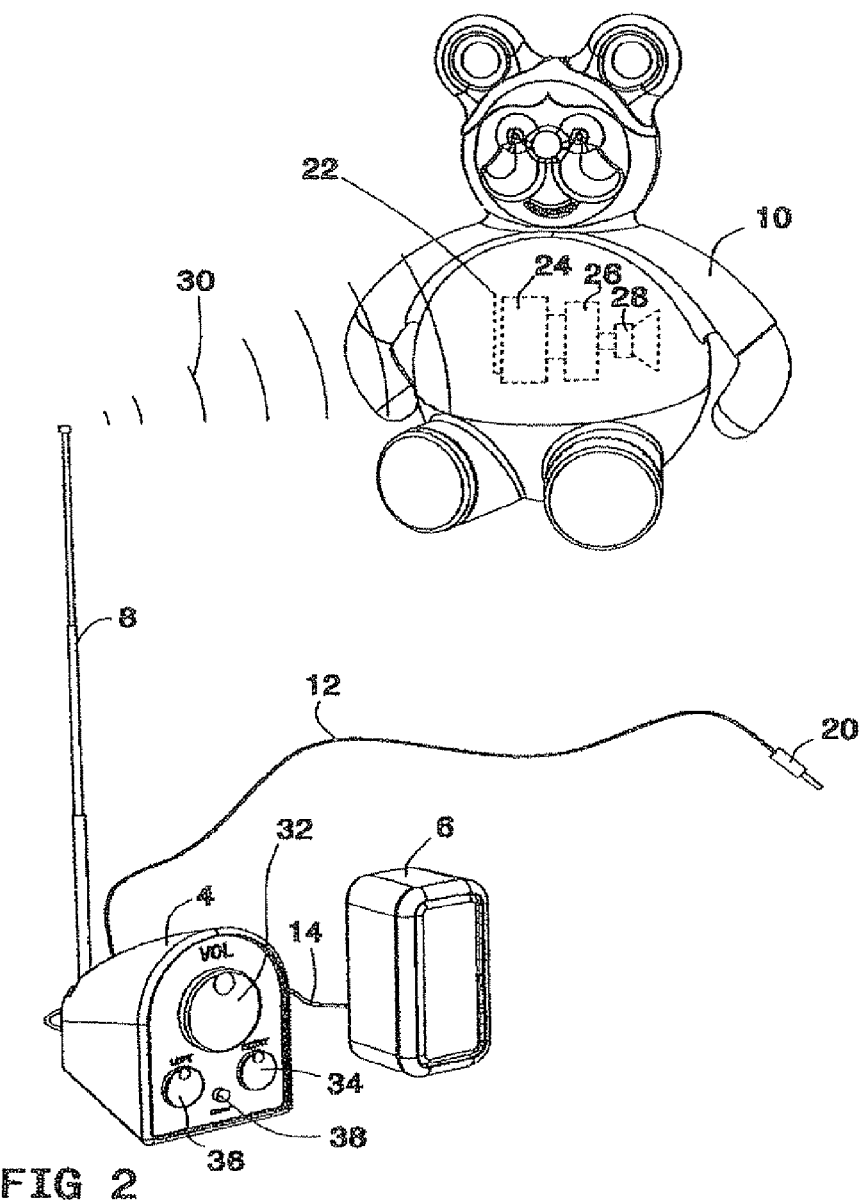
FIG. 2 is a more detailed illustration of the audio animation system illustrated in FIG. 1.

FIG. 2 is a more detailed illustration of the audio animation system illustrated in FIG. 1.

In the system illustrated in FIGS. 1 and 2, a user, such as an infant, may participate in a lesson, for example, a singing lesson. In the lesson, there is a teaching FIG. 18, and two pupils: the user (not illustrated) and the bear puppet 10.

During the lesson teacher FIG. 18 may ask bear puppet 10 to sing a song, and afterwards ask the user (the infant) to repeat the song. The user may communicate with the teaching figure through the user interface of the computer. For example, the teaching FIG. 18 may ask the user "Shall we practice today the song 'Marry Had a Little Lamb'?" Two animated icons may appear on display 16, such as a clown that nods his head for "yes", and another clown that shakes his head for "no". The user may point on the desired icon. The presence of an additional puppet 10 in the lesson may be relaxing, since the puppet itself is a friendly figure.

From the technical point of view, apparatus 4 is an audio player which comprises two audio channels. The output of one of the audio channels is played by a speaker 6 which is connected to apparatus 4 by wired connection, and the output of the other channel is played by a speaker 28, which is connected to apparatus 4 by wireless connection.

Apparatus 4 is referred to herein also as "control unit".

Speaker 6 is associated with teaching FIG. 18, and therefore preferably it is placed in proximity to FIG. 18. However, for the sake of clarity, in FIG. 1 speaker 6 is not placed in close proximity to display 16 (which displays FIG. 18).

Plug 20 of the stereo cord 12 has to be connected to the left or right exit of an audio player, which in FIG. 1 is the computer 2. The audio player may also be an MP3 (MPEG-1 Audio Layer-3) player, a cassette player, a DVD (Digital Versatile Disc) system, and so forth.

The control unit 4 comprises two audio channels and a radio transmitter for transmitting the audio signal of one of the channels. A user may control the output volume of the audio channels by knobs 34 and 36. In order to be associated with a stereophonic audio system, volume knobs 34 and 36 are marked as "LEFT" and "RIGHT", correspondingly. The user may adjust the volume of all audio channels by a single knob 32, while the volume ratio between the channels is maintained. Antenna 8 transmits the audio signal of the "left" audio channel. Button 38 turns apparatus 4 on and off.

The remote speaker unit, which resides inside bear puppet 10, operates as follows: an antenna 22 receives the transmitted signal from apparatus 4; the audio signal received through antenna 22 reaches receiver 24; the received audio signal is amplified by amplifier 26 and played by speaker unit 28. Elements 24, 26 and 28 are displayed in dashed lines, in order to emphasize that they are deployed inside puppet 10, and therefore are not seen.

Figure 3:
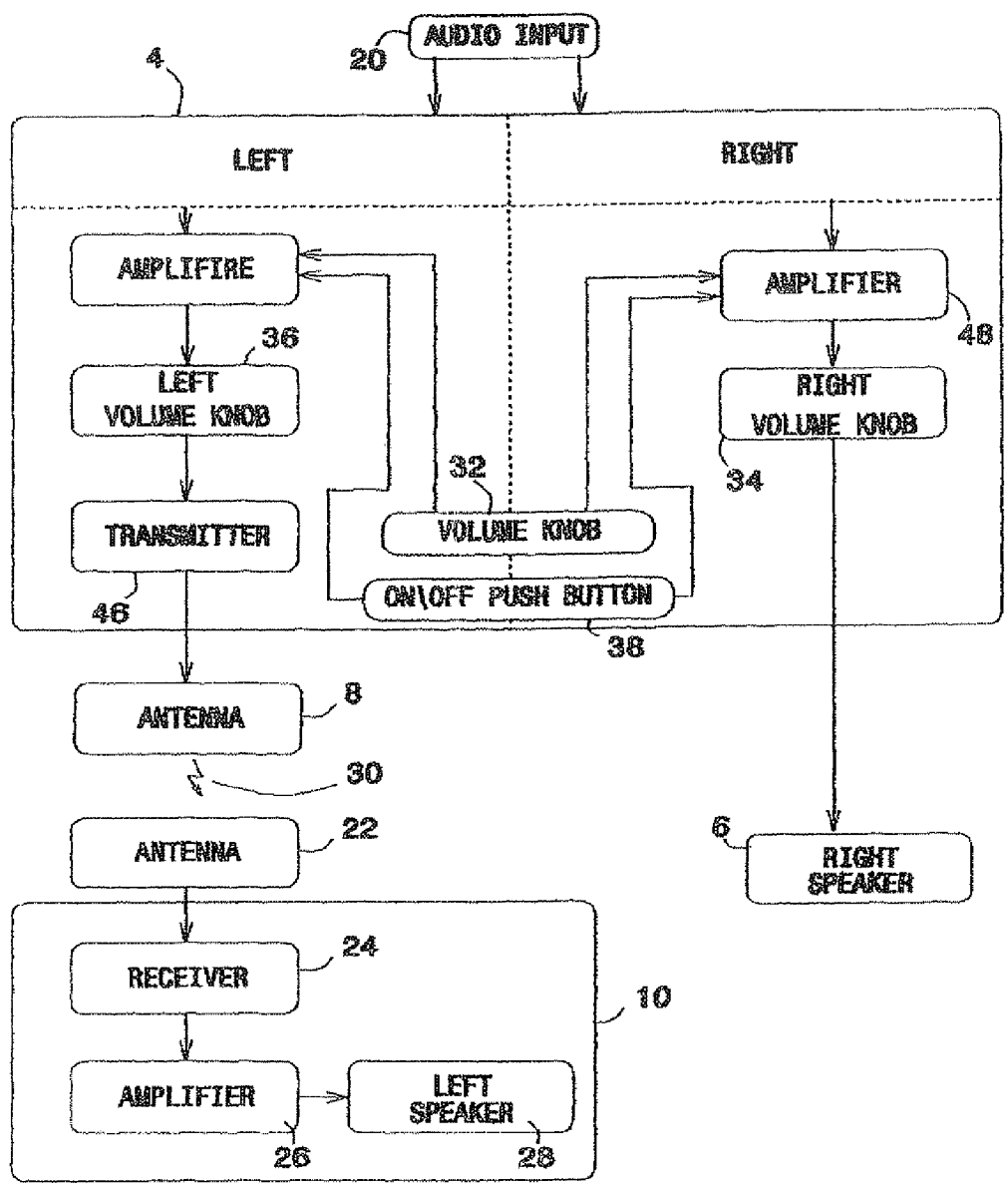
FIG. 3 is a block diagram that schematically illustrates the electronic structure of an audio animation system, according to one embodiment of the invention.

FIG. 3 is a block diagram that schematically illustrates the electronic structure of an audio animation system, according to one embodiment of the invention.

In this scheme, two audio channels are employed, one referred as "left" and the other as "right", as in stereophonic equipment. However, it should be understood that more audio channels may be used.

The input source, such as an MP3 player (not illustrated), must be connected to the audio input jack 20.

According to this embodiment, control unit 4 is a stereo audio player, the "left" audio channel of which is coupled with a transmitter 46 for transmitting by wireless transmission the output audio signal thereof to a corresponding remote receiver 24 (in order to be played by speaker 28). The "right" input signal is played by speaker 6, which is connected to apparatus 4 by wires.

As per the "left" audio channel, the input signal from the audio input jack 20 is amplified by amplifier 50, and transmitted via transmitter 46 and the corresponding antenna 8. The transmission (marked herein as numeral 30) is received by receiver 24 through the antenna 22 thereof, and amplified by amplifier 26. The amplified audio signal is played by speaker 28. The volume of the played signal is adjustable by the left volume knob 36.

As per the "right" audio channel, the input from the audio input jack 20 is amplified by amplifier 48, and played by speaker 6, which is connected to the control unit by wires. The volume of the played signal is adjustable by the right volume knob 34.

The volume of both speakers is adjustable by the "main" volume knob 32, while the ratio between the volume of the "left" and "right" output signal is maintained.

An important advantage of the design illustrated in FIG. 3 is that it employs a stereophonic audio system. Nowadays stereophonic audio systems are very common, and therefore they may be employed in an audio animation system of two speakers without—or almost without—further modifications. Furthermore, since stereophonic audio systems are so common, their price is relatively inexpensive.

Nevertheless, it should be noted that stereophonic display is merely an example, and other systems, featuring more audio channels, may be employed in audio animation systems.

According to one embodiment of the invention, speaker 6 may be embedded within control unit 4. In this way, the same casing may be used for control unit 4 and speaker 6.

Figure 4:
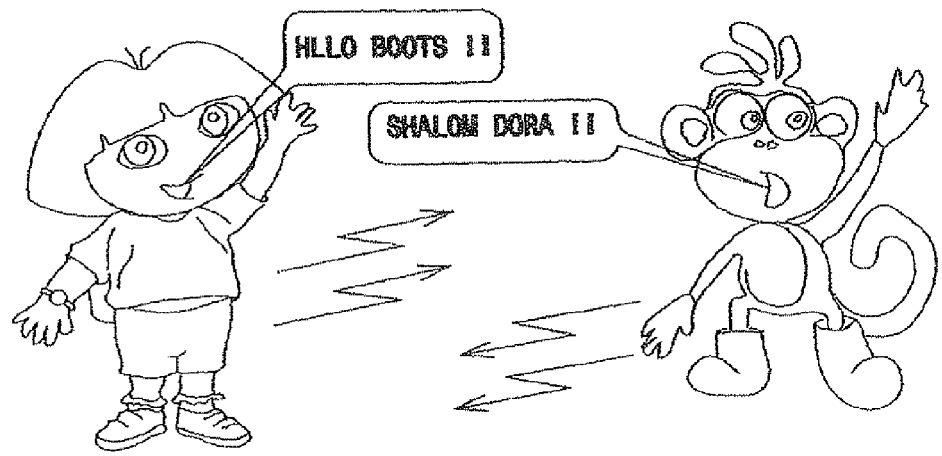
FIG. 4 is schematically illustrates two non-biotic figures "having a conversation", according to one embodiment of the invention.

FIG. 4 is schematically illustrates two non-biotic figures "having a conversation", according to one embodiment of the invention.

In this case the non-biotic figures are puppets. One figure is referred to as "Dora", and the other figure is referred to as "Boots". The "conversation" may be such as an English lesson, a chat, and so forth.

Figure 5A:
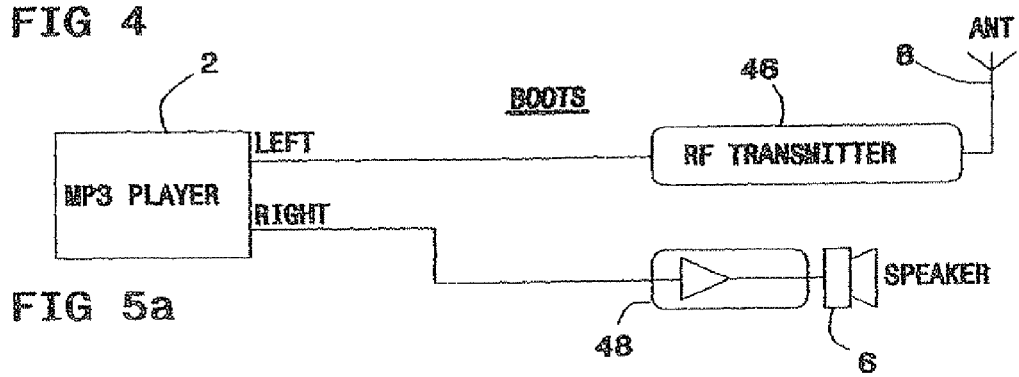
FIG. 5a is an electronic scheme which illustrates the circuitry embedded inside the puppet of Boots of FIG. 4.

FIG. 5a is an electronic scheme which illustrates the circuitry embedded inside the puppet of Boots of FIG. 4.

The audio player device 2 is an MP3 player, and the like.

The left speaker of the MP3 player 20 is connected to an RF transmitter 46, which transmits via antenna 8 the audio to be played by the "left" speaker 28. The right speaker 6 of the MP3 player 20 is deployed inside the puppet of Boots.

Figure 5B:
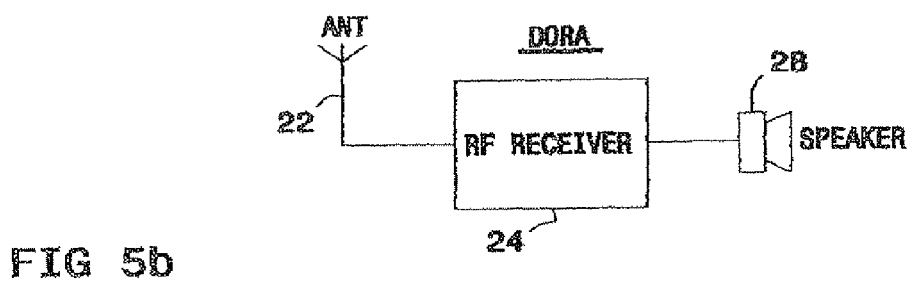
FIG. 5b is an electronic scheme which illustrates the circuitry embedded inside the puppet of Dora of FIG. 4.

FIG. 5b is an electronic scheme which illustrates the circuitry embedded inside the puppet of Dora of FIG. 4.

The RF signal transmitted by the RF transmitter 46 of Boots is received by the RF receiver 24 of Dora through antenna 22, and played by speaker 28.

Figure 6:
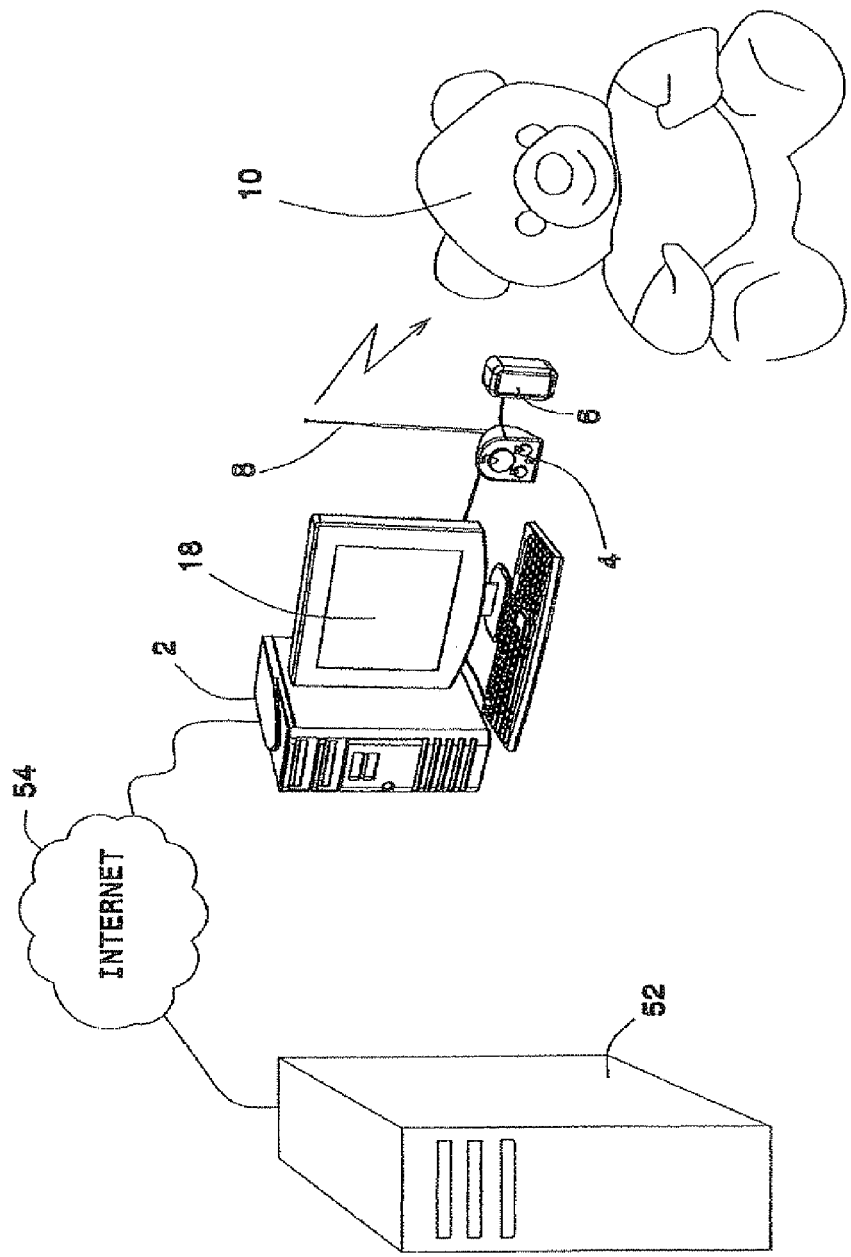
FIGS. 6 to 8 schematically illustrates an audio animation system which plays content provided over a network, according to one embodiment of the invention.
Figure 7:
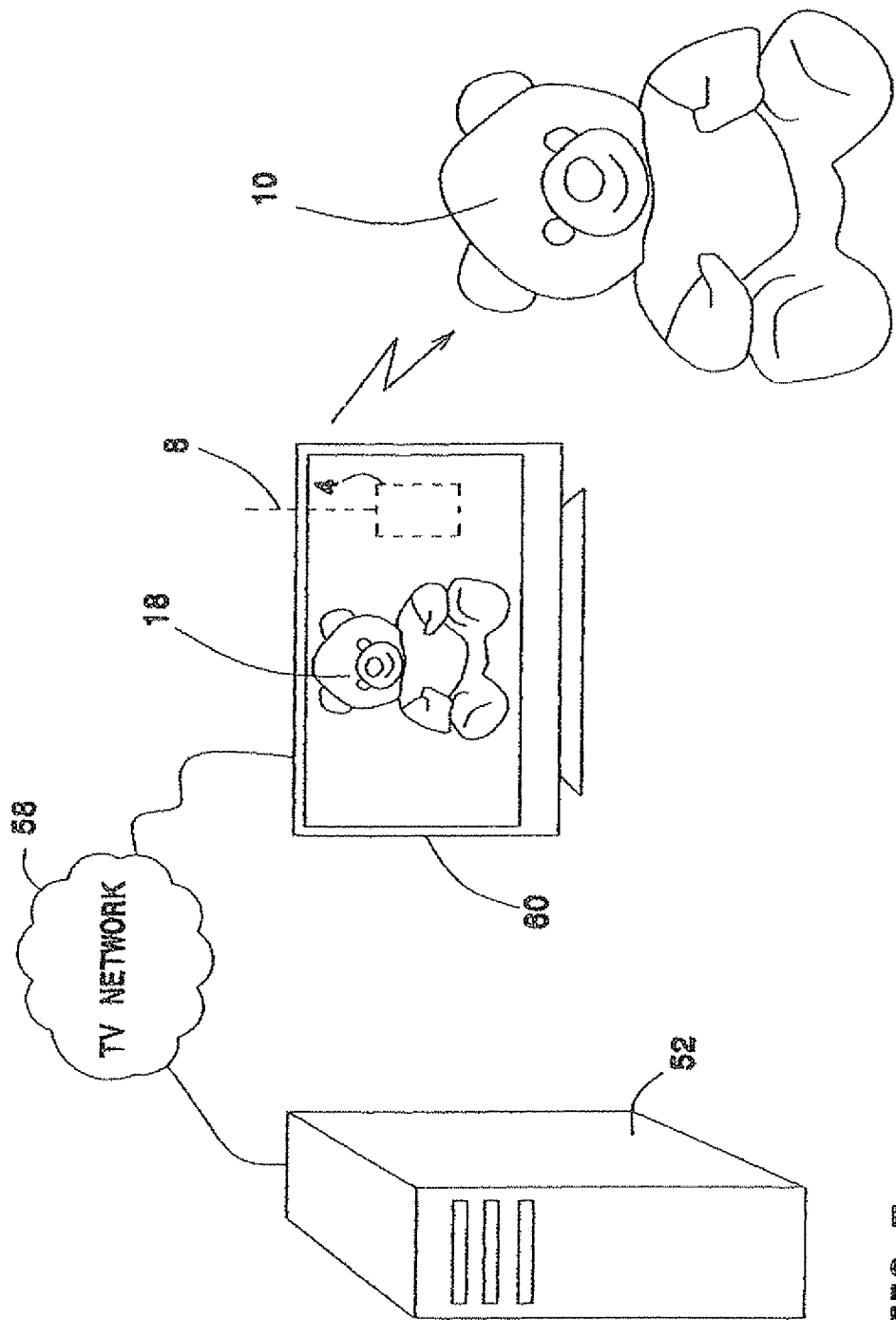
Figure 8:
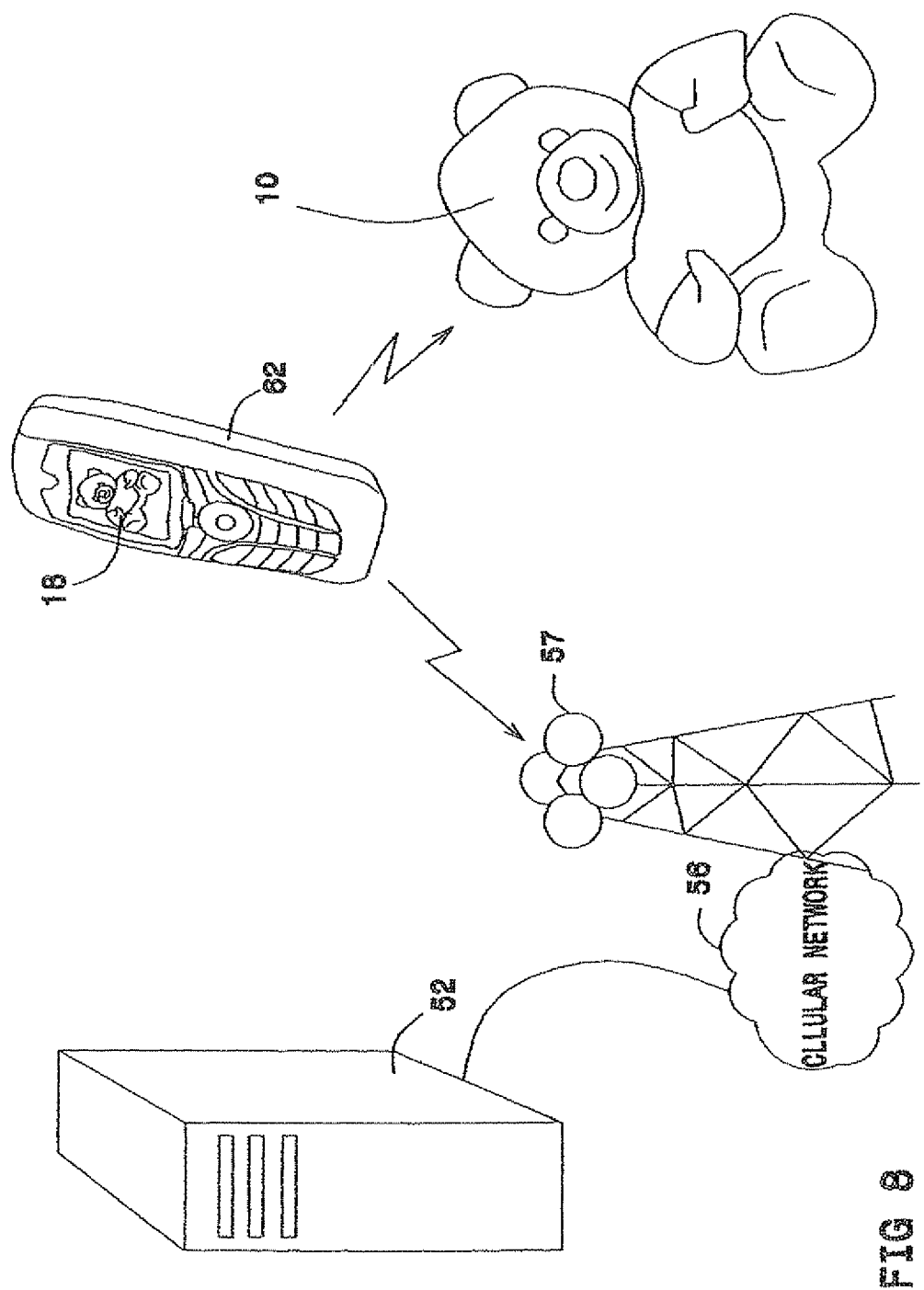

Each of FIGS. 6 to 8 schematically illustrates an audio animation system which plays content provided over a network, according to one embodiment of the invention.

According to these embodiments of the invention, a content server 52 provides the content to be played/displayed by the audio animation system. The content server may send digital data as well as analog information, such as audio and/or video signals. The content sever may comprise a computerized system, circuitry, and so on, for transmitting the content to a user's control unit 4. The transmission may be carried out via a network such as data network (e.g., the Internet), telephone network such as cellular network, cable TV network, and so on.

FIG. 6 schematically illustrates an audio animation system in which the content server 52 communicates with user's personal computer 2 via the Internet network 56.

In this embodiment the control unit 4 may be embedded within computer 2, or alternatively added externally to the computer, as explained above. Of course a relay and the like may switch between the connection with the speaker or with the control unit.

FIG. 7 schematically illustrates an audio animation system in which the content server 52 communicates with user's TV set 60 via a cable TV network 58.

In this embodiment the control unit 4 may be embedded within the TV set 60, or alternatively added externally to the TV set, as explained above. Of course a relay and the like may switch between the connection of the TV set with its speaker or with the control unit.

FIG. 8 schematically illustrates an audio animation system in which the content server 52 communicates with a user's cellular telephone 62 via a cellular network 56.

In this embodiment the control unit 4 may be embedded within the cellular telephone 62, or alternatively added externally to the telephone, as explained above. Of course a relay and the like may switch between the connection of the telephone with its speaker or with the control unit.

It should be noted that presently cellular telephones comprise also audio abilities, such as MP3 player coupled with stereophonic exits to headphones, speakers, and the like.

The use of a cellular telephone with regard to an audio animation system may be employed for determining the content sent from the content server to the control unit 4. For example, a user may select an audio animated lesson by an SMS (Short Message Service) message, a Web page, and so on.

The use of a content server may be applied in commercial models which employ the invented audio animation technology disclosed herein. For example, a user may be charged for a live broadcast or uploaded information from the content server to the control unit of the user.

The content transmitted by the content server to the user's control unit of the audio animated system may be transmitted as a live broadcast or streaming media (a multimedia continuously received by, and normally displayed to, the end-user while it is being delivered by the provider), or as information to be downloaded.

According to embodiments of the invention, the audio signal played to a user may be controlled by an input signal provided by the user, e.g., by interaction means thereof. The interaction means may include a user interface, such as mouse, keyboard, display, buttons, and so on.

According to one embodiment of the invention, the interaction means comprise speech recognition means alternatively or additionally to other interaction means. The speech recognition means provide to the system ability to interact with infants and other illiterate individuals, and therefore is suitable for carrying out interactive lessons for such persons. In such a lesson a pupils may provide an answer to a question he is asked by content played/displayed by the control unit.

Furthermore, when the system is connected to the Internet, the speech recognition means may be used also as means for interacting with an Internet browser and the like, therefore enabling an infant to interact with the browser, the Web server that operates a Web site, and so on.

Such a system may further comprise speech-to-text converter, thereby providing a user with ability to provide through the user interface textual information, even without typing the text. An older user may use the text-to-speech ability for interacting with a Web site, such as a search engine, even without typing the keywords of a search.

In the case where the audio player is a DVD, the display 16 may be a display of a DVD player. Doll 10 may interact with an animated figure displayed on the display 16. For example, the doll 10 may talk to a person shown on the display 16 of the DVD player. The person shown on the display 16 may interact with the doll and with a child simultaneously. As an example, the person on the display may say "I want you to meet a doll by the name of "Dora". As a result of an audio signal sent from the speaker unit of the DVD player to the receiver 24 inside doll 10 by way of antenna 22, doll 10 may move its head and say "Hello". A speech recognition unit and/or a digital processing unit, as well as well-known mechanical toy means, will mate the audio signal mentioning the word "Dora" with a particular movement of the doll, such as the bowing of the head of the doll. In that way, the child will be left with the impression that the doll understands what was said to it by the animated character on the display. In like manner, the child, the doll and the animated character on the display of the DVD player can interact together.

Doll 10 may also interact with a character or other content displayed on a web site. For example, in the context of an interaction in the form of a lesson for the child user, the web site may have questions. Suppose the web site displays an equation representing an addition function such as "2+2=?". The web site may also list multiple choice answers. The doll may produce an audio signal saying to the child, "Do you see the board on the web site?". In response to "Yes", the character or display may ask the child to "select the correct answer" in one or more interactive exchanges. If the child then selects and clicks on "1+1=2" the doll may talk to the child and say "that is correct". If, on the other hand, the child clicks on a choice such as "1+1=3", the doll may produce an audio signal saying the words "wrong, let me explain why". In this way, the child may interactively be helped with homework, for example.

In accordance with one embodiment, an audio animation system may comprise a three-dimensional doll and an audio player, the audio player comprising a DVD player having an associated display monitor for displaying an animated character of a DVD. The audio player may have a first audio source corresponding to the doll and a second audio source corresponding to the animated character.

The audio player may be capable of simultaneously playing the audio signals associated with the doll and of the animated character. A first speaker unit positioned close to the doll may cause a listener to associate the first audio signal with the doll. A second speaker unit close to the display monitor may cause a listener to associate the second audio signal with the DVD player.

The audio player may also have an interaction means by which the doll, the animated character and a child user may interact with one another. For example, the interaction means may be a digital processing unit, that may be located in the doll or that may be connected to the doll and/or to the display monitor. The digital processing unit may signal organs or other portions of the doll to move based on the content of the audio signal transmitted by the animated character and received by the doll. The child may respond to the conversation between the doll and the animated figure on the display screen, for example by writing something, saying something or doing something.

In accordance with one embodiment of the present invention, the present invention may be expressed as a method of having animated figures interact with a child, comprising the following steps. In a first step the method may involve providing a doll having a receiver for receiving an audio signal, the doll having a digital processor connected to a first speaker unit for converting the audio signals into movements of portions of the doll. The receiver and speaker unit may form part of an audio player that is associated with the doll. A further step may involve providing a DVD player also forming part of the audio player, the DVD player including a second speaker unit and a display monitor connected to a computer, the computer connected to a web site on the World Wide Web, the web site providing content that includes animated figures. A further step of the method may involve positioning the first speaker closer to the doll than to the display monitor and positioning the second speaker unit closer to the display monitor than to the doll so that a child interacting with the doll and the display monitor associate sound from the first speaker with the doll and associate sound from the second speaker with the display monitor. In another step the child may be positioned so that the child can simultaneously see and hear both the doll and an animated character seen on the display monitor. In a further step the doll may talk to the child about the animated character and the animated character may talk to the child about the doll so that the child, the doll and the animated character are interacting in a three-way conversation. The child's participation in the "three-way" conversation my involve activity by the child such as writing or saying something or doing something. In some case, the non-biotic figures may not be able to respond to the child. In other cases, the "three-way" conversation may be such that the non-biotic figures may have receiving means to interpret the child's statements. If the interaction means, for example, comprises a speech-to-text converter, the child's statements can be received and interpreted by the audio player. The audio player involved in the method of the present invention may be any audio player referred to in any of the embodiments.

In the description and figures herein, the following numerals have been mentioned:

Numeral 2 denotes an audio player, such as a CD player, a personal computer, and so forth;

Numeral 4 denotes a control unit;

Numeral 6 denotes a speaker connected to an audio system by wired means;

Numeral 8 denotes an antenna of a transmitter;

Numeral 10 denotes a puppet comprising a receiver, an audio amplifier for amplifying signal received by the receiver, and a speaker playing the amplified signal;

Numeral 12 denotes a stereo cord (i.e., composed of two pairs of wires);

Numeral 14 denotes a cable for connecting a speaker to an amplifier;

Numeral 16 denotes a computer's display;

Numeral 18 denotes an animated figure;

Numeral 20 denotes a jack;

Numeral 22 denotes an antenna of a radio receiver;

Numeral 24 denotes a radio receiver;

Numeral 26 denotes an amplifier;

Numeral 28 denotes a speaker unit;

Numeral 30 denotes a signal of radio transmission;

Numeral 32 denotes a knob for adjusting the volume of all the channels;

Each of numerals 34 and 36 denotes a knob for adjusting the volume of an audio channel;

Numeral 38 denotes a button to turn apparatus 4 on and off;

Numeral 40 denotes a user (an infant);

Numeral 42 denotes a box;

Numeral 44 denotes a system comprising a receiver, an amplifier and speaker;

Numeral 46 denotes a radio transmitter;

Each of numerals 48 and 50 denotes an amplifier;

Numeral 52 denotes a content server;

Numeral 54 denotes the Internet network;

Numeral 56 denotes a cellular network;

Numeral 57 denotes a base station of cellular network 56;

Numeral 58 denotes a cable TV network;

Numeral 60 denotes a television set; and

Numeral 62 denotes a cellular telephone.

While certain features of the invention have been illustrated and described herein, the invention can be embodied in other forms, ways, modifications, substitutions, changes, equivalents, and so forth. The embodiments described herein should be considered as illustrative and not restrictive.

What is claimed is:

1. An audio animation system, comprising:
a first three-dimensional non-biotic figure and a second three-dimensional non-biotic figure, each of the first and second non-biotic figures resembling a life-like figure;
said first non-biotic figure having:
an audio player for simultaneously broadcasting a first audio signal for a first audio channel and a second audio signal for a second audio channel;
an amplifier for amplifying said first audio signal conveyed through said first channel;
a first speaker for playing audio of the first audio channel corresponding to the amplified first audio signal input from said amplifier;
a radio frequency transmitter for transmitting radio frequency signals based upon said second audio signal through said second audio channel;
a transmitting antenna for transmitting said radio frequency signals from said radio frequency transmitter;
said second non-biotic figure having:
a receiving antenna for receiving said radio frequency signals transmitted from said transmitting antenna;
a radio frequency receiver for receiving said radio frequency signals from said receiving antenna;
a second speaker for playing audio of the second audio channel corresponding to the second audio signal from said radio frequency receiver,
the audio animation system providing the first and the second audio signals such that the first audio channel corresponds to a part in a conversation spoken by the first non-biotic figure and the second audio channel corresponds to a part in the conversation spoken by the second non-biotic figure.

2. A system according to claim 1, wherein the second audio signal played by the second speaker through the second audio channel is dependent for its content on the audio player and independent for its content of the amplified first audio signal played by the first speaker through the first audio channel and wherein the amplified first audio signal played by the first speaker through the first audio channel is dependent for it content on the audio player and independent for its content of the second audio signal played by the second speaker through the second audio channel.

3. A system according to claim 1, wherein said audio player is an MP3 player.

4. A system according to claim 1, wherein broadcasting of the radio frequency signals by said audio player to the second non-biotic figures is wireless from the transmitting antenna to the receiving antenna.

5. A system according to claim 1, wherein said audio player is selected from a group comprising: a computer, DVD, an MP3 player, a cassette player.

6. A system according to claim 1, further comprising circuitry for wireless transmission of the radio frequency signals of at least one of said audio channels to at least one of the speakers thereof.

7. A system according to claim 6, further comprising interaction means with a user thereof.

8. A system according to claim 7, wherein each of said non-biotic figures further comprises means for moving one or more organs of said non-biotic figure.

9. A system according to claim 7, wherein said system is configured so that a child listening to the non-biotic figures can select and vary audio content.

10. A system according to claim 1, wherein the first and second non-biotic figures are situated close enough to one another to be seen by a child as interacting with one another in a conversation.

11. A system according to claim 1, wherein said first and second audio channels are of a stereophonic device.

12. A system according to claim 1, wherein the content of said first and second audio channels is provided without use of a cable and without passing through a network.

13. A system according to claim 1, wherein the content of said first and second audio channels is provided through wireless transmission.

14. A system according to claim 1, wherein a visual image of the first non-biotic figure and a visual image of the second non-biotic figure enhance an illusion of life created by the presentation to the child of the conversation between the first and second three-dimensional non-biotic figures.

15. A system according to claim 1, wherein the audio player has a wired connection to the first speaker of the first non-biotic figure for broadcasting the first audio channel and the audio player is connected to transmitter that broadcasts the second audio channel wirelessly to the second non-biotic figure.

16. A system according to claim 1, wherein the content of said first and second audio channels is provided by a memory card.

17. A system according to claim 1, wherein the radio frequency signals are radio frequency audio signals.

18. An audio animation system according to claim 1, wherein the audio channels provide synchronized audio content configured to present to a child a conversation between the two or more non-biotic figures.

19. An audio animation system, comprising:
a first three-dimensional non-biotic figure and a second three-dimensional non-biotic figure, each of the first and second non-biotic figures resembling a life-like figure;
said first non-biotic figure having:
an audio player for simultaneously broadcasting a first audio signal for a first audio channel and a second audio signal for a second audio channel;
an amplifier for amplifying said first audio signal conveyed through said first channel;
a first speaker for playing audio of the first audio channel corresponding to the amplified first audio signal input from said amplifier;
a transmitter for transmitting electromagnetic signals based upon said second audio signal through said second audio channel;
a transmitting antenna for transmitting said electromagnetic signals from said transmitter;
said second non-biotic figure having:
a receiving antenna for receiving said electromagnetic signals transmitted from said transmitting antenna;
a receiver for receiving said electromagnetic signals from said receiving antenna;
a second speaker for playing audio of the second audio channel corresponding to the second audio signal from said receiver,
the audio animation system providing the first and the second audio signals such that the first audio channel corresponds to a part in a conversation spoken by the first non-biotic figure and the second audio channel corresponds to a part in the conversation spoken by the second non-biotic figure.

20. A system according to claim 19, wherein said system is configured so that statements of a child listening to the non-biotic figures are interpreted by the audio player using a speech to text converter.

21. An audio animation system, comprising:
a first three-dimensional non-biotic figure and a second three-dimensional non-biotic figure;
each of the non-biotic figures resembling a life-like figure;
said first non-biotic figure having:
an audio player for broadcasting a first audio signal for a first audio channel and a second audio signal for a second audio channel;
a first speaker for playing audio of the first audio channel corresponding to the first audio signal from said audio player;
a transmitter for transmitting electromagnetic signals based upon said second audio signal through said second audio channel;
a transmitting antenna for transmitting said electromagnetic signals from said transmitter;
said second non-biotic figure having:
a receiver for receiving said electromagnetic signals transmitted from said transmitting antenna;
a second speaker for playing audio of the second audio channel corresponding to the second audio signal from said receiver,
the audio animation system providing the first and the second audio signals such that the first audio channel corresponds to a part in a conversation spoken by the first non-biotic figure and the second audio channel corresponds to a part in the conversation spoken by the second non-biotic figure.

\* \* \* \* \*